United States Patent
Crowe et al.

(10) Patent No.: US 10,255,615 B2
(45) Date of Patent: Apr. 9, 2019

(54) SYSTEM AND METHOD FOR CONTEXTUAL VIRTUAL LOCAL ADVERTISEMENT INSERTION

(75) Inventors: Keith Aubrey Crowe, Cedar Park, TX (US); James Pratt, Round Rock, TX (US); Marc Andrew Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 728 days.

(21) Appl. No.: 12/834,166

(22) Filed: Jul. 12, 2010

(65) Prior Publication Data
US 2012/0011002 A1    Jan. 12, 2012

(51) Int. Cl.
*G06Q 30/00*    (2012.01)
*G06Q 30/02*    (2012.01)

(52) U.S. Cl.
CPC ..... *G06Q 30/0241* (2013.01); *G06Q 30/0251* (2013.01); *G06Q 30/0269* (2013.01)

(58) Field of Classification Search
CPC .................................................. G06Q 30/0255
USPC ...................................................... 705/14.53
See application file for complete search history.

(56) References Cited

U.S. PATENT DOCUMENTS

| | | | |
|---|---|---|---|
| 5,710,884 A * | 1/1998 | Dedrick | H04L 29/06 709/217 |
| 5,926,179 A * | 7/1999 | Matsuda et al. | 715/752 |
| 6,256,043 B1 * | 7/2001 | Aho et al. | 345/629 |
| 6,954,728 B1 * | 10/2005 | Kusumoto et al. | 705/14.4 |
| 6,981,220 B2 * | 12/2005 | Matsuda | G06F 17/30899 707/E17.119 |
| 8,069,168 B2 * | 11/2011 | Fitzpatrick et al. | 707/732 |
| 8,271,330 B2 * | 9/2012 | Brignull | G06Q 30/02 705/14.52 |
| 8,527,345 B2 * | 9/2013 | Rothschild | G06Q 30/02 705/14.53 |
| 2002/0052788 A1 | 5/2002 | Perkes | |
| 2009/0132361 A1 | 3/2009 | Titus | |
| 2009/0271422 A1 * | 10/2009 | Finn et al. | 707/101 |

\* cited by examiner

*Primary Examiner* — Matthew T Sittner
(74) *Attorney, Agent, or Firm* — Guntin & Gust, PLC; Ralph Trementozzi (57) ABSTRACT

A system and method for presenting advertising, the method including but not limited to presenting on a first end user device, a first personalized advertisement in a first avatar's view of a virtual world and presenting on a second end user device, a second personalized advertisement in a second avatar's view of the virtual world.

18 Claims, 4 Drawing Sheets

SYSTEM AND METHOD FOR CONTEXTUAL VIRTUAL LOCAL ADVERTISEMENT INSERTION

FIELD OF THE DISCLOSURE

The present invention relates to the field of targeted advertising.

BACKGROUND OF RELATED ART

In recent years computer applications, such as massively multiplayer role-playing games have become extremely popular. One example of a computer application enables a participant to create and develop a fictional character represented by an avatar in a virtual world. A given participant may develop, among other things, a storyline, a reputation, and attributes of her fictional character by interacting in the virtual world via the avatar. Other examples of computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. Computer applications generally permit the fictional character to travel across the virtual locations and interact with the virtual objects and other fictional characters or avatars in the virtual world.

DETAILED DESCRIPTION

The following detailed description is directed to technologies for delivering advertising in a virtual world. Through the utilization of the technologies and concepts presented herein, an avatar may be provided with a virtual object containing an advertisement. Additionally, an advertisement may be provided within the virtual world that utilizes the avatar within the advertisement. In this case, the avatar may be used to promote the advertisement by appearing within the advertisement.

While the subject matter described herein is presented in the general context of program computer program components that execute in conjunction with the execution of an operating system and application programs on a computer system, those skilled in the art will recognize that other implementations may be performed in combination with other types of program computer program components. Generally, program computer program components include computer programs stored in a tangible, non-transitory computer readable storage medium that are executed by a processor to perform useful functions. The computer programs further comprise routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Exemplary virtual worlds may include any massively multiplayer online ("MMO") computer application including, but not limited to, massively multiplayer online role-playing games ("MMORPGs"), virtual social communities, online video games, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world is generally inhabited by avatars, which are virtual or symbolic representations of real world participants such as end users operating an end user device to interact with the virtual world (hereinafter referred to as participants). As such, each avatar is typically associated with and controlled by an end user device controlled by a particular participant. Avatars may include two-dimensional and/or three-dimensional images. Through the virtual world, the avatars may interact with other avatars, as well as with virtual objects and advertisements. Virtual objects may include virtual representations of real world objects, such as houses, cars, billboards, clothes, and soda cans, as well as fanciful creations, such as a teleportation machine or a flying car. According to exemplary embodiments, one or more virtual objects and one or more avatars in the virtual world are capable of providing an advertisement. The avatars and the virtual objects utilized in the virtual world may or may not be animated images.

The present disclosure relates to the concept of this idea is to provide a mechanism for local advertisements to be inserted into video games or any virtual world. The idea is to provide areas within a video game that can be sold as advertisements for local businesses, similar to the way that local advertisements are done for television. An example of this would be a video game in which the end user controlled avatar walks through a city with billboards. The billboards could display an advertisement. For game players in New York, an illustrative embodiment might display a local financial company, for players in Seattle it might display a local coffee shop. This idea could be expanded almost infinitely to include virtually every aspect of the video games virtual world. Everything from local businesses such as car lots, restaurants, bars, to everyday items like local newspapers, local radio stations, local news, etc. could be integrated into the virtual world. The virtual city could be selected by the user or automatically determined based on their IP address. Then the advertisements will appear based on a virtual city in which the end user physically exists.

The cityscape could even mimic the actual city or physical worldly terrain and have the same billboards as the real city layout, such as Pittsburgh or Copenhagen. In this situation the same advertisement as the real advertisement could be displayed or another advertisement could be displayed. For example, the Coca-Cola sign in Time Square could become a sign for a local Manhattan business. For multiplier games, a specific billboard could display the same advertisement for each player, and just like in the real world, the better locations could demand a higher price. This idea could be used for various types of games including virtual world games, multiplayer games, street race games, etc. In another embodiment each player is presented with a different advertisement. In another embodiment, each player is presented with a different advertisement having a particular data type selected based on a context of other players present as a group in the game. Advertising data types can be video, audio, text, image, icon or enhancements to an avatar representing an end user.

These virtual local advertisements could also be dynamic and change automatically based on the agreement with the local business. Another option is to include interactive advertisements where the player could click on the ad or walk into a local restaurant and be able to download or email a coupon for that location. In another embodiment, avatars representing players or end users in the virtual world can interact with a virtual host or hostess in a virtual business, such as a bar or restaurant in the virtual world. Rather than monitoring the players conversation with the virtual host or hostess, the responses from the virtual host or hostess, representing the hostess's portion of the interaction or conversation with the avatars, are monitored and used as part of the context for selecting advertisements and for selecting advertising data types based on the context. Context can also include but is not limited to profiles for players assembled together in a particular region of the virtual world and/or a current state (stage level, activity, etc.) of a game played by the end user avatars in the virtual world. Advertisements are selected and presented to individual players based on current context. In another embodiment, advertisements are also selected and presented to two or more individual players based on current context. Advertisement data types are selected based on a particular end user's historical response to a particular advertising data type in a particular context.

In another embodiment, each player in a virtual world has an associated data profile including but not limited to profile data indicating which data types for advertisements which have attracted each player's interest in the past. The data types include but are not limited to video, audio, text and image advertisements. Thus, if in the past a first particular player has responded to an audio advertisement in a first particular context, when that particular player enters a virtual world and the first particular context is repeated, an audio ad will be presented to the player. Likewise, if in the past a particular second player has responded to a video advertisement, when that particular player enters a virtual world in the first particular context, a video ad will be presented to the player. Thus, a second player present with the first player in the virtual world in the first particular context will receive a video ad. Likewise, if in the past a particular player, a third player has responded to a text advertisement in the first particular context, when that particular player enters the virtual world in the first particular context, a text ad will be presented to the player.

In another embodiment, players participating as avatars in a virtual world are identified and included in an ad presented to them in their view of the virtual world. For example, a first player named Sam would be presented with an advertisement for a new car with the name "Sam" on the license plate. If Sam enters the car, music selected based on Sam's profile would play while Sam is in the car. Each player could have their own name shown on the car in the advertisement shown to them in the virtual world as a personal ad enhancement. Thus, Susan would see a car with Susan on the license plates and music selected based on Susan's profile would play while Susan is in the car. Personalized ad enhancements are stored at each end user's (player's) end user device.

In another embodiment, context further includes but is not limited to a context of a player's activities is used as an "activity context" for advertisements. For example, when a player named Joe, via his avatar obtains a new level in virtual world, Joes activity context represents this an audio advertisement is be played to Joe, such as, an announcement, "congratulations Joe, this Bud's for you." Associated ads can be presented to Joe based on a context for Joe at the time he achieves the new level in the virtual world. Likewise, a player named Susan could be offered a virtual diamond pendant shaped in the letters "S U S A N" as a prize as a reward to achieving particular goal in a virtual world represented by her activity context. Associated ad can be presented to Susan based on a context for Susan at the time she achieves the goal.

In another embodiment, a context of one or more particular players being currently present or assembled together in a virtual world is used as a context to select an advertisement. In another embodiment, a context of one or more players currently present or assembled together in a virtual world is used to select an advertisement data type based on an end user's response to data types in the virtual world. For example if a group of 18-22 year old boys is present in a virtual gaming world, then an advertisement with young women 18-22 can be presented to the group of boys. Vice versa, if a group of 18-22 year old girls is present in a virtual gaming world, then an advertisement with young men 18-22 can be presented to the group of girls. In another embodiment, advertising data types are selected based on context, for example, visual advertisements (video, image, text) are presented during times when context indicates that conversations between avatars are occurring or loud back ground noise is occurring in the virtual world; and audible advertisements are presented to the avatars when the context indicates that quiet times without conversation and background noise are occurring in the virtual world.

In another embodiment, end users that are represented by avatars in a virtual world, can communicate and interact with each other's avatars and with virtual beings such as a virtual host or hostess created in the virtual world. The communications with the hostess can be audible or textual such as text messages or selection from a menu in a virtual restaurant. A selection from the menu can cause a verbal response from the hostess, such as, "Okay, I'll bring your XYZ beer out to you", indicating the brand of beer ordered by the avatar. In a particular embodiment, the responses of the virtual beings or hostess in the virtual world are monitored for key words used to create context to select advertising data types to be presented to the avatars. The conversations, whether audible or textual, of the avatars and are not monitored unless the players indicate that they want to be monitored so that their conversations can be used to select advertisements presented to the group or individually to members of the group. The contexts are derived from the virtual beings monitored responses in interactions with the avatars and interactions are used to select key words for targeted advertisements to be presented to each avatar in the virtual world.

In another particular embodiment, a method is disclosed for presenting advertising, the method including but not limited to presenting on a first end user device, a first advertisement in a first avatar's view of a virtual world; and presenting on a second end user device, a second advertisement in a second avatar's view of the virtual world. In another embodiment of the method, the first advertisement is based on a first end user profile for a first end user associated with the first avatar and the second version of advertisement is based on a second end user profile for a second end user associated with the second avatar. In another embodiment of the method, the first end user profile further includes but is not limited to response data for an advertising data type selected from the group consisting of text, video, audio and image data indicating the first end user's preference for one of the advertising data types.

In another embodiment of the, the method further includes but is not limited to monitoring a virtual hostess' responses to interactions between the virtual hostess object and at least one of the first and second avatar in the virtual world; and selecting key words from the virtual hostess responses to select advertising to present to the first and second avatars. In another embodiment of the method, the method further includes but is not limited to selecting a first advertising data type for the advertisement presented to the first avatar; and selecting a second advertising data type for the advertisement presented to the second avatar, wherein the second advertising data type is different than the first advertising data type.

In another embodiment of the method, the method further includes but is not limited to determining a current context based on a combination of a plurality of end users' profiles for two or more end users represented as avatars in the virtual world; and selecting an advertising data type for a particular one of the plurality of end profile data indicating the particular end user's response to a data type in the current context.

In another embodiment, a system is disclosed for presenting advertising, the system including but not limited to a processor in data communication with a tangible non-transitory computer readable medium; and a computer program comprising instructions stored in the computer readable medium, the computer program comprising, instructions to present on a first end user device, a first advertisement in a first avatar's view of a virtual world; and instructions to present on a second end user device, a second advertisement in a second avatar's view of the virtual world. In another embodiment of the system, the first advertisement is based on a first end user profile for a first end user associated with the first avatar; and the second version of advertisement is based on a second end user profile for a second end user associated with the second avatar.

In another embodiment of the system, the first end user profile further comprises preference data for an advertising data type selected from the group consisting of text, video, audio and image data indicating the first end user's preference for one of the advertising data types. In another embodiment of the system, the computer program further includes but is not limited to instructions to monitor a virtual hostess' responses to interactions between the virtual hostess object and at least one of the first and second avatar in the virtual world; and instructions to select key words from the virtual hostess responses to select advertising to present to the first and second avatars. In another embodiment of the system, the computer program further includes but is not limited to instructions to select a first advertising data type for the advertisement presented to the first avatar; and instructions to select a second advertising data type for the advertisement presented to the second avatar, wherein the second advertising data type is different than the first advertising data type. In another embodiment of the system, the computer program further includes but is not limited to instructions to determine a current context based on a combination of a plurality of end users' profiles for two or more end users represented as avatars in the virtual world; and instructions to select an advertising data type for a particular one of the plurality of end profile data indicating the particular end user's response to a data type in the current context.

In another embodiment, a tangible, non-transitory computer readable medium for storing a computer program executed by a processor in presenting advertising is disclosed, the computer program including but not limited to instructions stored in the computer readable medium, the computer program comprising, instructions to present on a first end user device, a first advertisement in a first avatar's view of a virtual world; and instructions to present on a second end user device, a second advertisement in a second avatar's view of the virtual world. In another embodiment of the medium, the first advertisement is based on a first end user profile for a first end user associated with the first avatar; and the second version of advertisement is based on a second end user profile for a second end user associated with the second avatar.

In another embodiment of the medium, the first end user profile further comprises preference data for an advertising data type selected from the group consisting of text, video, audio and image data indicating the first end user's preference for one of the advertising data types. In another embodiment of the medium, the computer program further includes but is not limited to instructions to monitor a virtual hostess' responses to interactions between the virtual hostess and at least one of the first and second avatar in the virtual world; and instructions to select key words from the virtual hostess responses to select advertising to present to the first and second avatars. In another embodiment of the medium, the computer program further includes but is not limited to instructions to select a first advertising data type for the advertisement presented to the first avatar; and instructions to select a second advertising data type for the advertisement presented to the second avatar, wherein the second advertising data type is different than the first advertising data type. In another embodiment of the medium, the computer program further includes but is not limited to instructions to determine a current context based on a combination of a plurality of end users' profiles for two or more end users represented as avatars in the virtual world; and instructions to select an advertising data type for a particular one of the plurality of end profile data indicating the particular end user's response to a data type in the current context.

Figure 1:
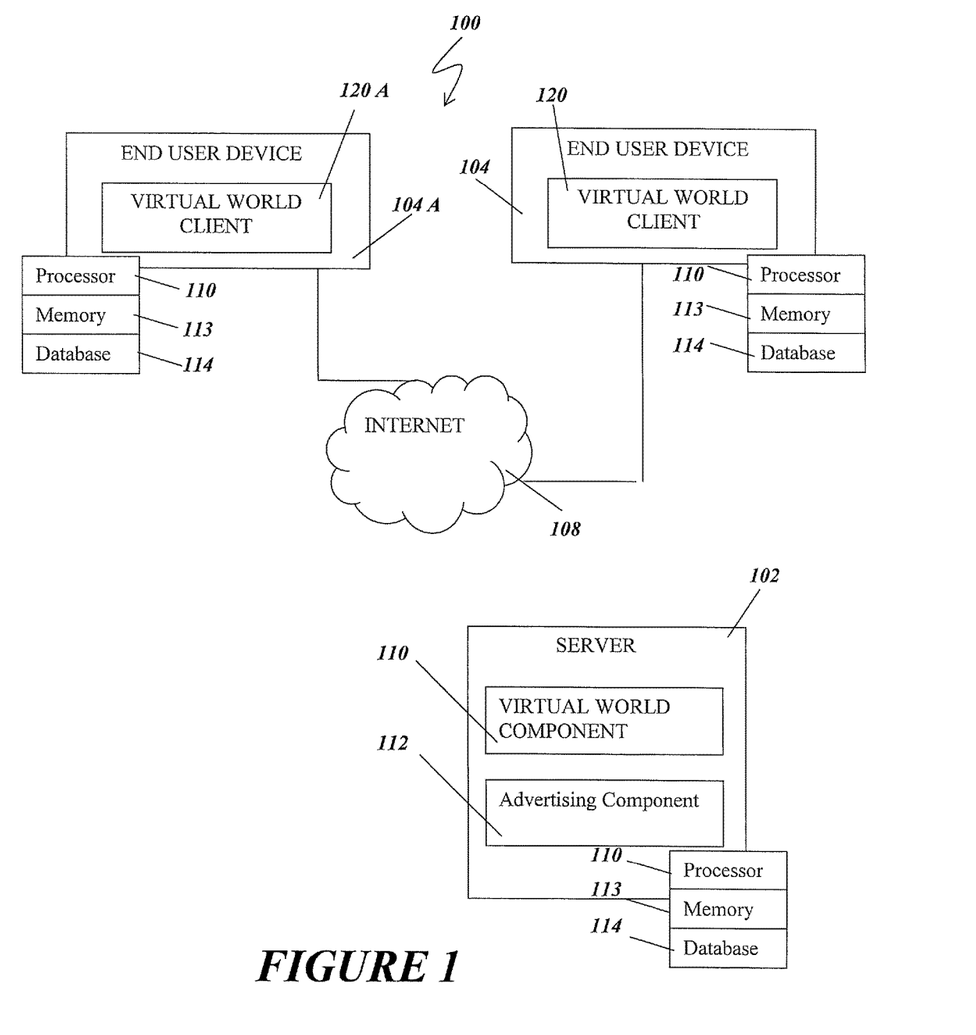
FIG. 1 is a schematic depiction of an illustrative embodiment of network architecture diagram showing aspects of a network architecture capable of implement a virtual world.

Turning now to FIG. 1, a server computer 102 or processor includes but is not limited to a virtual world server computer program component 110 and an advertising computer program component 112. The virtual world server computer program component 110 generally administers the virtual world and serves as a conduit between multiple end user devices, including the end user device 104. The advertising computer program component 112 generally enables an advertiser or other user to distribute advertising within the virtual world. The advertising computer program component 112 may include an advertisement database 114, an advertising computer program component, including but not limited to advertising data of different data types, and a portal computer program component, as illustrated in FIG. 1. The advertisement database 114 may store one or more advertisements including but not limited to advertising data of different data types. The different data types may include but are not limited to video, audio, text and image data types. The advertisement database 114 may include advertising data uploaded by an advertiser, for example.

An advertiser or other user may access the advertisement database 114 via the portal computer program component. In one embodiment, the portal computer program component provides a user interface that enables an advertiser to access the advertisement database 114 via a network such as the internet 108. In particular, the advertiser may utilize the processor 106 to access the portal computer program component. The processor may include a portal access computer program component 122 that enables communication with the portal computer program component via the network 108, as illustrated in FIG. 1. In one embodiment, the portal access computer program component 122 is a web browser or an end user device such as a cell phone, set top box on an internet protocol television system or a personal data assistant, or web tablet. The portal computer program component may enable an advertiser or other user to upload advertisements into the advertisement database 114. The advertisements may be in any data type including, but not limited to text, audio, pictures, video, and combinations thereof. The portal computer program component may provide the advertiser or other user with a number of other options, such as an option to choose which avatars to select or target, how often avatars are selected or targeted, and the amount and type of compensation provided to the participants. Advertising data selection and/or targeting may be performed by specifying matching criteria such as the location of the participant, advertising data type preferred by the participant, the current context in the virtual world relative to the participant, relevant demographics, the presence of the participant with respect to other participants present in the virtual world, and relevant game attributes (e.g., the avatar is in a soccer stadium, the avatar has reached a threshold level within a game).

When a participant desires to access the virtual world from an end user device, the participant may initiate the virtual world from the end user device computer program component 120 to establish a session with the virtual world server computer program component 110 via the network 108. During the session, the virtual world server computer program component 110 may transmit virtual world data (e.g., environment layouts, avatar movements of other participants) associated with the virtual world to the virtual world end user computer program component 120. Similarly, the virtual world end user computer program component 120 may transmit data from associated input devices to the virtual world server computer program component 110. The virtual world end user computer program component 120 may further interact with the advertising computer program component 112 to provide advertisements in the virtual world. Alternatively, the virtual world server computer program component 110 may act as a conduit between the virtual world end user computer program component 120 and the advertising computer program component 112 such that virtual world end user computer program component 120 and the advertising computer program component 112 need not directly communicate.

In one particular embodiment, advertisements presented to each end user are personalized so that each end user sees a different version of an advertisement in their particular view of the virtual world. Personalized advertising data, used to customize an advertisement so that it is personal to the particular end user, are down loaded to an end user device and stored in a data base at the end user device to which the advertisement personalization data pertains. In another particular embodiment, advertisements presented to each end user are personalized so that each end user is presented with a different advertisement. In another particular embodiment, advertisements presented to each end user are personalized so that each end user is presented with a different advertising data type for an advertisement.

Figure 2:
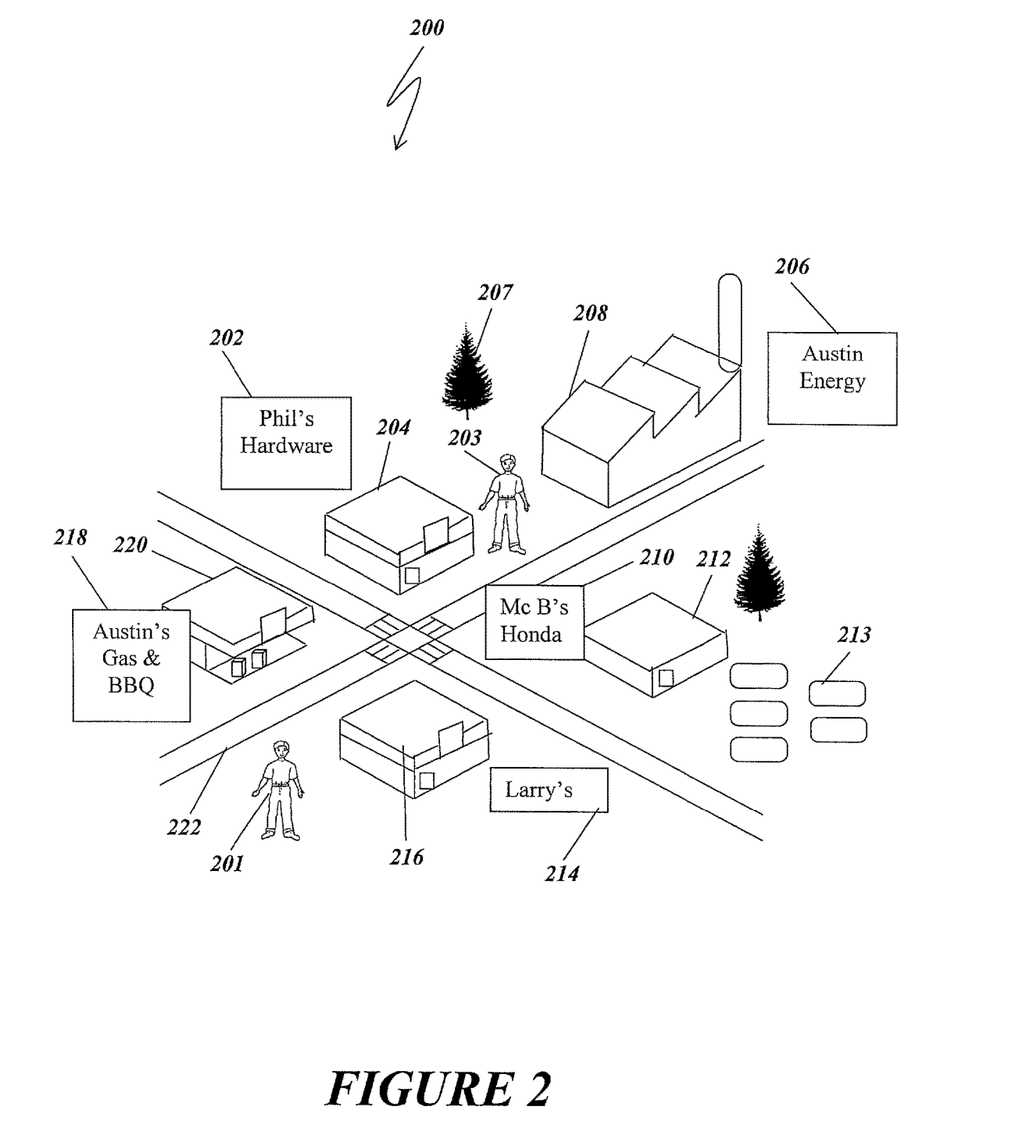
FIG. 2 is a depiction of a virtual world created in an illustrative embodiment.

Turning now to FIG. 2, as shown in FIG. 2, in a particular illustrative embodiment, a virtual world 200 is created by a process in which a first avatar 201 and a second avatar 203 exist. The virtual world as shown in FIG. 2 includes but is not limited to a digital simulation of a city including but not limited to streets 222, buildings 216, 212 208, 204 and 220, cars 213 and advertising billboards 206, 202, 218 and 214. Visual advertising including but not limited to video, text and icons can be presented as personalized advertisements to a particular end user's personalized view of the virtual world, as a visual display on the advertising billboards or on the building or cars or any other visual object in the virtual world. Audio advertising can be presented as personalized advertisements in a particular end user's personalized view of the virtual world, as an audible object in the virtual world. Personalized ads are presented only to the end user avatar for which the personalized ad is intended. Thus, when the first second and third avatars are present together in the virtual world, the first avatar is presented with a first personalized ad, the second avatar is presented with a second personalized ad, and the third avatar is presented with a third personalized ad. For example, each avatar could see their own name on the tag of the same car in their view of the virtual world. Moreover, each avatar could be presented with a End users response to advertising data types and current context in the virtual environment are monitored and stored in a data base for selecting advertisements based on an end user's past response in a particular context. Thus, if a particular end user has responded to text advertising data type over audible advertising in a particular context in the past, for example, in the presence of other avatars of the same sex or in a particular stage of a game, text advertising is selected as the advertising data type for the particular end user when that context occurs again.

Figure 3:
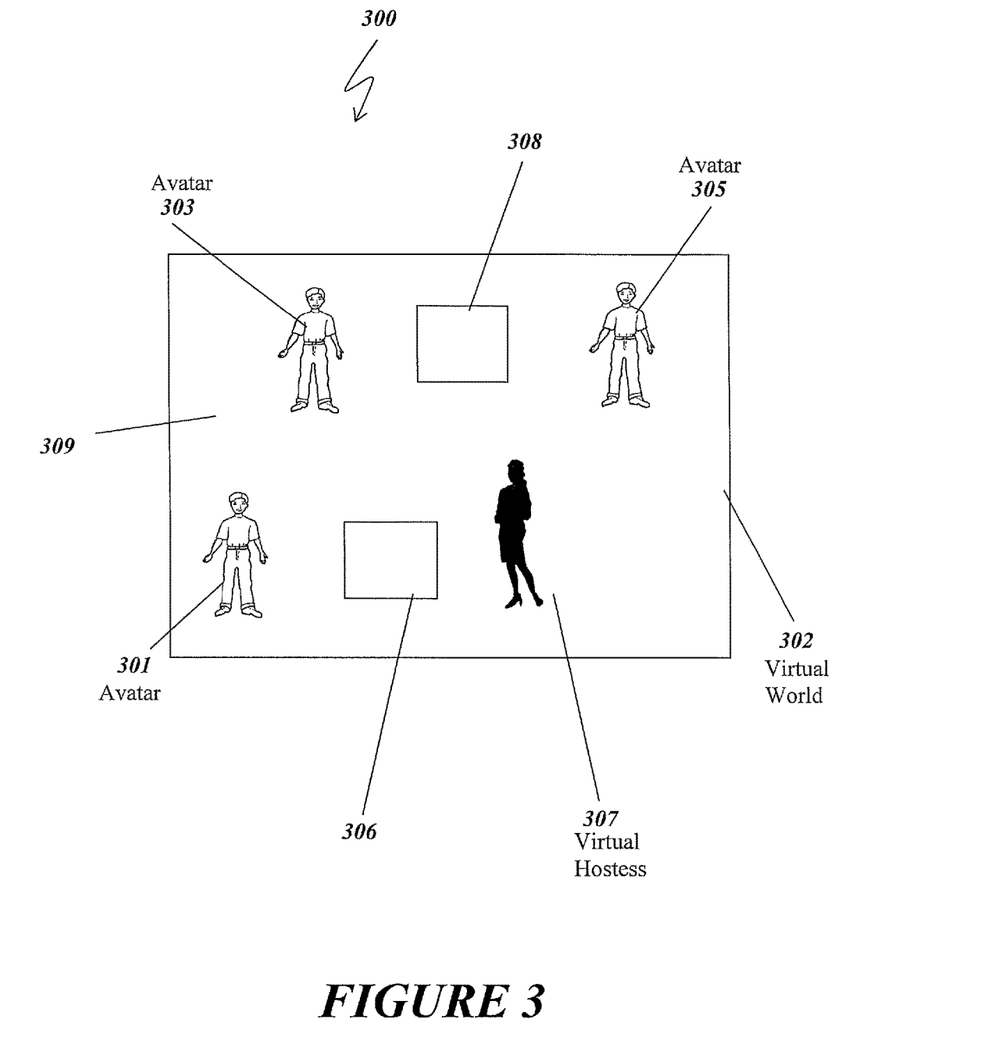
FIG. 3 is a depiction of a virtual world created in an illustrative embodiment.

Turning now to FIG. 3, in particular embodiment of a virtual world 300 avatars 301, 303, 305 and virtual hostess 307 are assembled together in particular region of the virtual world, such as a room 309 representing a restaurant in the virtual world. Personalized advertising, including but not limited to visual or aural versions of the same advertisement or different advertisements, is presented to each avatar in their personal view of the virtual world. Thus, each avatar may see a personalized version of the same advertisement. Each avatar may be presented with a different data type for the same advertisement in the virtual world. Virtual objects 306 and 308 are used to represent items such as restaurant tables and a menu in the restaurant. Each avatar can interact with the hostess via spoken words, text messages or physical manipulation of a virtual object such as a menu. The virtual hostess' responses are monitored and used to change the context and associated advertisements presented based on the change in context. The hostess remarks can also be sent back to advertisers for feedback in preparing new advertisements for presentation in the virtual world.

Figure 4:
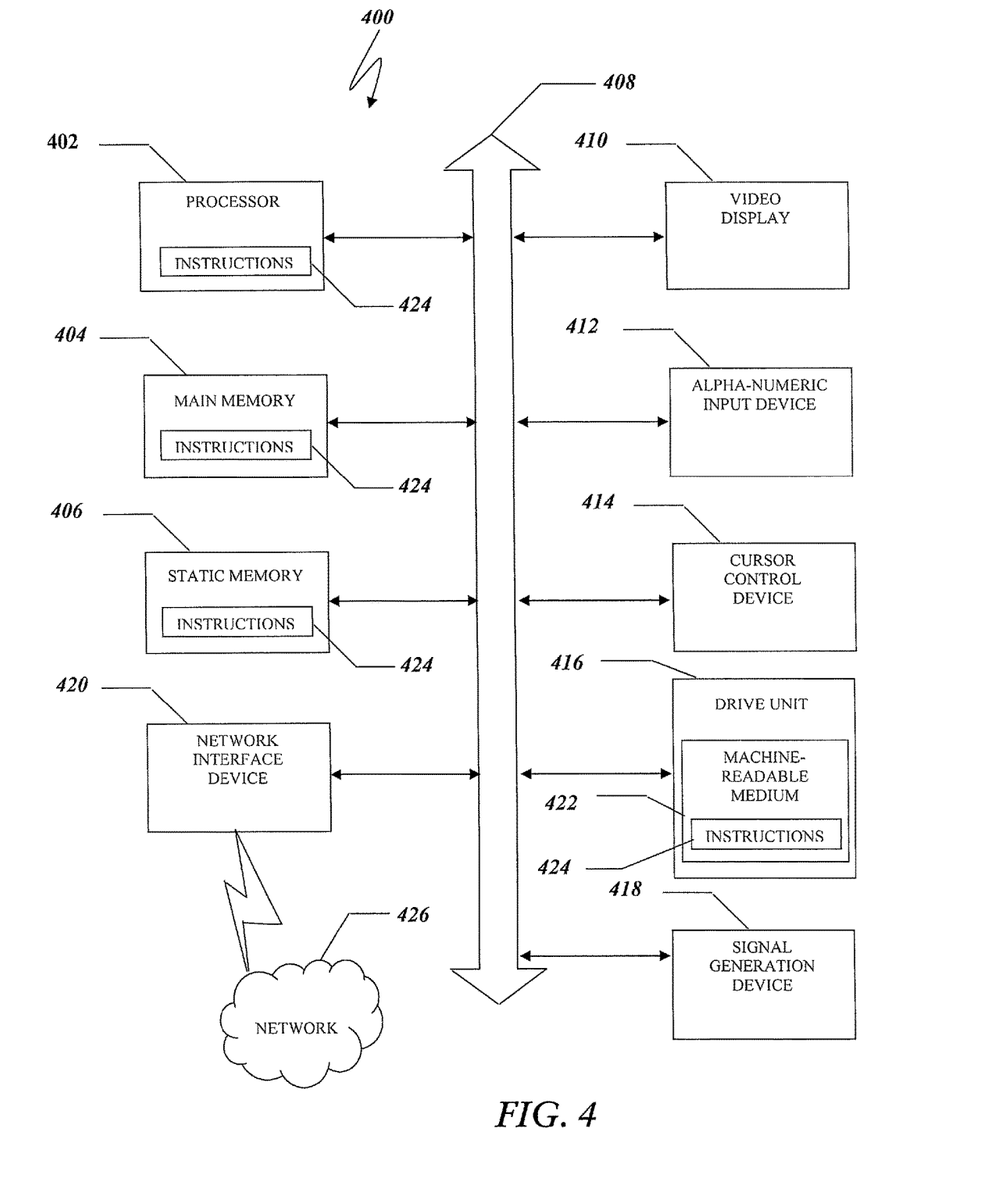
FIG. 4 is a diagrammatic representation of a machine in the form of a computer system within which a set of instructions, when executed, may cause the machine to perform any one or more of the methodologies discussed herein.

FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user (end user) machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (CPU), or both), a main memory 404 and a static memory 406, which communicate with each other via a bus 408. The computer system 400 may further include a video display unit 410 (e.g., liquid crystals display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface.

The disk drive 416 may include machine-readable medium 422 on which is stored one or more sets of instructions (e.g., software 424) embodying any one or more of the methodologies or functions described herein, including those methods illustrated in herein above. The instructions may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods describe herein. Applications that may include the apparatus and systems of various embodiments broadly include a variety of electronic and computer systems. Some embodiments implement functions in two or more specific interconnected hardware computer program components or devices with related control and data signals communicated between and through the computer program components, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a tangible, non-transitory machine or computer readable storage medium containing instructions 424, or that which receives and executes instructions 424 so that a device connected to a network environment 426 can send or receive voice, video or data, and to communicate over the network 426 using the instructions 424. The instructions 424 may further be transmitted or received over a network 426 via the network interface device 420. The machine readable medium may also contain a data structure for containing data useful in providing a functional relationship between the data and a machine or computer in an illustrative embodiment of the disclosed system and method.

While the machine-readable medium 422 is shown in an example embodiment to be a single medium, the terms "machine readable medium" and "computer readable medium" should be taken to include a single medium or multiple media (e.g., a centralized or distributed database, and/or associated caches and servers) that store the one or more sets of instructions. The terms "machine-readable medium" and computer readable medium shall also be taken to include any medium that is capable of storing, encoding or carrying a set of instructions for execution by the machine and that cause the machine to perform any one or more of the methodologies of the present invention. The terms "machine readable medium" and "computer readable medium" shall accordingly be taken to include, but not be limited to: solid-state memories such as a memory card or other package that houses one or more read-only (non-volatile) memories, random access memories, or other rewritable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for presenting advertising, the method comprising:
    monitoring on a processor, a response from a first avatar for a first end user to one of a plurality of advertising data types in one of a plurality of contexts in a virtual world;
    determining on the processor a preferred advertising data type for the first avatar for the first end user in each of the plurality of contexts;
    determining on the processor, from the plurality of contexts, a current context for the first avatar for the first end user;
    determining a preferred data type for the first end user in the current context for the first end user's avatar;
    presenting on a first end user device, a first personalized advertisement having the preferred data type for the current context in the first avatar's view of the virtual world;
    determining a preferred data type of a second end user in the current context for a second end user's avatar; and
    presenting, a second personalized advertisement in a second avatar's view of the virtual world, wherein a second advertising data type for the second personalized advertisement is the second end user's preferred data type in the current context.

2. The method of claim 1, wherein the current context for the first end user's avatar comprises the first avatar and the second avatar appearing together in the virtual world.

3. The method of claim 1, wherein the current context for the first end user's avatar comprises data indicating a quiet time in the virtual world without conversation between avatars in the virtual world and without background noise occurring in the virtual world, the method further comprising:
    determining that the current context data indicates a quiet time and sending an advertisement having an audio advertising data type to an end user when the particular context indicates quiet time and sending a visual advertisement having one of a data type when the current context data indicates an audio conversation occurring between the first avatar and the second avatar in the virtual world.

4. The method of claim 1, the method further comprising:
    determining that the current context data does not indicate a quiet time and sending an advertisement having a video advertising data type to an end user when the particular context does not indicate a quiet time and sending a visual advertisement having one of a data type when the current context data indicates an audio conversation occurring between the first avatar and the second avatar in the virtual world.

5. The method of claim 1, wherein the second advertising data type is different than the first advertising data type.

6. The method of claim 1, the method further comprising:
    determining the current context for the first avatar based on a combination of a plurality of end users' profiles for at least two end users currently represented as avatars in the virtual world; and
    selecting an advertising data type for a particular one of the plurality of end users indicating the particular end user's response to a data type in the current context.

7. A system for presenting advertising in a virtual world, the system comprising:
    a processor in data communication with a tangible non-transitory computer readable medium;
    a computer program comprising instructions stored in the non-transitory tangible computer readable medium, the computer program comprising:
        instructions to monitor at the processor, a first end user's avatar for a first end user's response to a particular advertising data type in one of a plurality of contexts in the virtual world, wherein the particular advertising data type is text;
        instructions to determine a preferred advertising data type for the first end user in each of the plurality of contexts;
        instructions to determine from the plurality of contexts, a current context for the first end user's avatar;
        instructions to determine a preferred advertising data type for the first end user in the current context for the first end user's avatar;
        instructions to present, a first personalized advertisement having the preferred advertising data type for the current context in the first avatar's view of the virtual world;
        instructions to determine at the processor, a preferred advertising data type for a second end user in the current context for the second end user's avatar; and
        instructions to present a second personalized advertisement in a second avatar's view of the virtual world, wherein a second advertising data type for the second personalized advertisement is the second end user's preferred advertising data type in a current context for the second end user's avatar in the current context.

8. The system of claim 7, wherein the current context for the first end user's avatar comprises a particular combination of the first end user's avatar and the second end user's avatar appearing together in the virtual world.

9. The system of claim 8, wherein the current context further comprises data indicating a quiet time without conversation between the first end user's avatar and the second end user's avatar and without background noise occurring in the virtual world, the computer program further comprising:

instructions to determine that data of the current context indicates a quiet time and sending an advertisement having an audio advertising data type to an end user associated with the first avatar when the current context data indicates the quiet time and sending a visual advertisement having one of a data type image, text and video when the particular context data indicates loud background noise present and conversation in the virtual world.

10. The system of claim 7, the computer program further comprising:

determining that data of the current context does not indicate a quiet time and sending an advertisement having an video advertising data type to and end user when the particular context does not indicate a quiet time and sending a visual advertisement having one of a data type when the current context data indicates an audio conversation occurring between the first and second end users' avatars in the virtual world.

11. The system of claim 7, wherein the second advertising data type is different than the first advertising data type.

12. The system of claim 7, the computer program further comprising:

instructions to determine a current context for the first end user's avatar based on a combination of a plurality of end users' profiles for two or more end users represented as avatars in the virtual world; and instructions to select an advertising data type for a particular one of the plurality of end users indicating the particular end user's response to an advertising data type in the current context.

13. A non-transitory computer readable medium for storing a computer program executed by a processor in presenting advertising, the computer program comprising instructions stored in the computer readable medium, the computer program comprising:

instructions to monitor a first end user's avatar for a first end user's historical response to a particular advertising data type in one of a plurality of contexts in a virtual world, wherein the particular advertising data type is, text;

instructions to determine a preferred advertising data type the first end user in each of the plurality of contexts;

instructions to determine from the plurality of contexts, a current context for the first end user's avatar;

instructions to determine a preferred advertising data type for the first end user in the current context for the first end user's avatar;

instructions to present on a first end user device, a first personalized advertisement having the advertising preferred data type for the current context in the first avatar's view of the virtual world, wherein a first advertising data type for the first personalized advertisement is based on a first end user's monitored historical response to a first advertising data type in the particular context in the virtual world;

instructions to determine a preferred advertising data type for a second end user in the current context for the second end user's avatar in the virtual world; and instructions to present on a second end user device, a second personalized advertisement in a second avatar's view of the virtual world, wherein a second advertising data type for the second personalized advertisement is the second end user's preferred advertising data type in a current context for the second end user's avatar in the current context.

14. The medium of claim 13, wherein the current context for the first end user's avatar comprises a particular combination of the first avatar and the second avatar appearing together in the virtual world.

15. The medium of claim 14, the current context further comprises data indicating a quiet time without conversation between the first and the second avatars and without background noise occurring in the virtual world, the computer program further comprising:

instructions to determine that data of the current context indicates a quiet time and sending an advertisement having an audio advertising data type to an end user associated with the first avatar when the current context data indicates the quiet time and sending a visual advertisement having an advertising data type image, text and video when the particular context data indicates loud background noise present in the virtual world.

16. The medium of claim 13, the computer program further comprising:

instructions to monitor at the processor a virtual hostess' responses to interactions between the virtual hostess and the first avatar and the second avatar in the virtual world; and instructions to, on the processor, select key words from the virtual hostess' responses to select advertising to present to the first and second end user devices associated with the first and second avatars.

17. The medium of claim 13, wherein the second advertising data type is different than the first advertising data type.

18. The medium of claim 13, the computer program further comprising:

instructions to determine a current context for the first avatar based on a combination of a plurality of end users' profiles for two or more end users represented as avatars in the virtual world; and instructions to select an advertising data type for a particular one of the plurality of end users indicating the particular end user's response to a data type in the current context.

* * * * *